United States Patent [19]

Allen

[11] 4,060,841
[45] Nov. 29, 1977

[54] MOTOR PROTECTOR FOR THREE-PHASE MOTORS

[76] Inventor: Ernest Duane Allen, Box 426, Hudson, Colo. 80642

[21] Appl. No.: 678,398

[22] Filed: Apr. 19, 1976

[51] Int. Cl.$^2$ ............................................. H02H 7/09
[52] U.S. Cl. ........................................ 361/33; 361/92
[58] Field of Search ................. 317/46, 47, 48, 27 R, 317/40 A, 13 B, 31; 361/92, 33, 88, 90

[56] References Cited

U.S. PATENT DOCUMENTS

| | | | |
|---|---|---|---|
| T948,003 | 7/1976 | Johnson et al. | 317/46 |
| 1,834,578 | 12/1931 | Conrad | 317/40 A |
| 2,553,949 | 5/1951 | Smith | 317/46 |
| 2,609,425 | 9/1952 | Turnupseed et al. | 317/46 |
| 3,056,067 | 9/1962 | Luber | 317/46 |
| 3,157,826 | 11/1964 | Norton | 317/46 |
| 3,260,897 | 7/1966 | Parker | 317/46 |

FOREIGN PATENT DOCUMENTS

| | | | |
|---|---|---|---|
| 221,207 | 4/1910 | Germany | 317/46 |

Primary Examiner—J. D. Miller
Assistant Examiner—Patrick R. Salce
Attorney, Agent, or Firm—Ancel W. Lewis, Jr.

[57] ABSTRACT

A motor protector for three-phase electric motors includes two independent sensing transformers for simultaneously sensing the voltage across two phases of a three-phase power supply to detect failures in all of the power lines including either the primary or secondary side of a line transformer. A first relay is actuated by the electric power sensed across the one phase and a second relay is actuated by the electric power sensed across said other phase through a set of contacts of the first relay for disconnecting the second sensing transformer from the power supply when there is a failure that results in a reduction in voltage in the one phase to prevent production of feedback voltages through the phase windings of a line transformer. For a wye-delta line transformer configuration the one phase is a high leg and the other phase is the low leg. At least the second, and optionally both, of said relays have a set of contacts arranged for controlling power to a holding coil of the motor control circuit so that a line failure in said power supply causes a de-energization of said one relay coil and simultaneously disconnects said second sensing coil from the other phase and removes electric power to said holding coil to remove the power from said power system to said electric motor. A failure in the power supply that results in a drop in voltage in the other phase has its contacts de-actuated to directly control the motor circuit to remove the electric power from the electric motor. A rheostat is provided in one or both of the circuits including the respective coils of said relays to adjust the voltage at which the associated relay contacts are de-actuated for greater sensitivity to reductions in line voltage and for adjusting the relays for motor currents of a particular motor installation.

6 Claims, 1 Drawing Figure

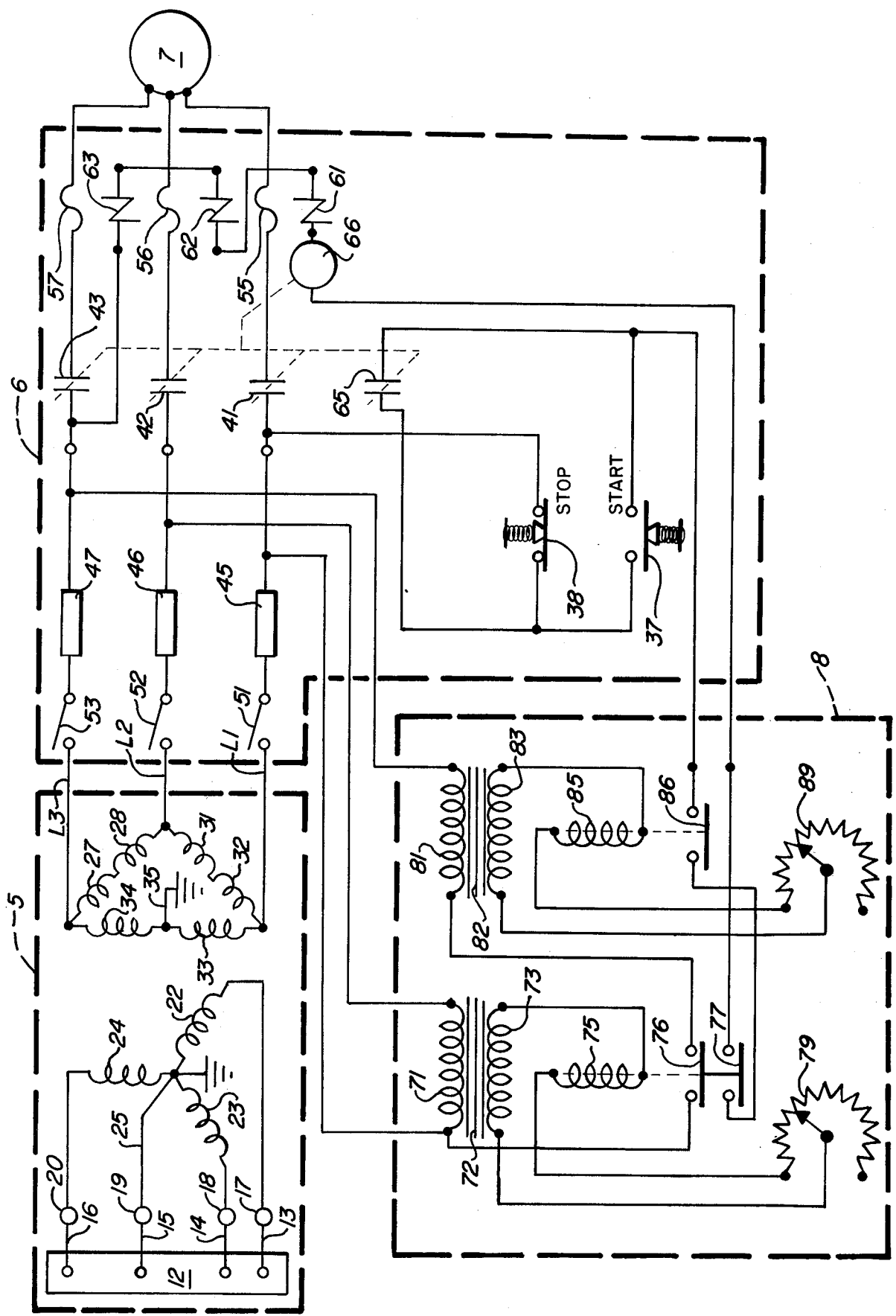

MOTOR PROTECTOR FOR THREE-PHASE MOTORS

FIELD OF THE INVENTION

This invention relates to a novel and improved apparatus for protecting three-phase motors from a variety of failures that may occur in a three-phase power system.

BACKGROUND OF THE INVENTION

Three-phase electric motors are frequently burned out or damaged by failures in the power lines of the power system resulting in reduced line voltages detected or sensed by accompanying motor protectors but are damaging to three-phase motors. Prior attempts to correct for all of the possible line failures in a three-phase power system in general have been generally complex and costly and in some instances have not been entirely satisfactory for all applications or all known line failure conditions.

As background, utility companies must supply a large number of single-phase loads from the same three-phase lines in rural areas and small industrial installations. As a result the utility companies are usually unable to install devices on these lines that cut off a complete power line. A failure in the power supply to the motor is what is commonly referred to as a "single-phase condition," which means that one of the phases or legs in the primary or secondary side of the step-down line transformer has failed. This failure can result in a blown primary fuse, primary line failure, a single breaker malfunction at the substation, or a blown secondary fuse or secondary line failure. Such a malfunction in the power line supplying power to the motor does not always result in a completely dead phase. In essence, an adequate voltge is produced through the line transformer windings with two fully energized supply lines to allow the motor to run under a low voltage condition. This creates heating problems of one winding of the motor causing the varnish to deteriorate rapidly and ultimately resulting in a burn-out. Another problem encountered for three-phase motors in rural areas is simply a dangerously low voltage condition. Three-phase motor installations also have different starting currents, for example two motors of the same horsepower but different running speeds where one may require a higher percentage of starting current than the other.

Accordingly, it is an object of the present invention to provide a novel and improved protector for three-phase motors that protects against single phasing conditions caused by secondary or primary line failures.

Another object of this invention is to provide a simple protective device that can be readily applied to all types of commonly used three-phase motors with no change in the motor control circuit and can be easily and readily installed as an auxiliary part of existing motor control circuits.

Yet another object of this invention is to provide a protector device for motors that can be field-set to each and every motor installation in the field and may be easily and quickly installed without requiring special experience.

A further object of this invention is to provide a device that is compact in size, can be installed adjacent to the magnetic starter or motor control circuit, does not take up any significant working space, and does not require a modification of the existing motor control circuit.

Yet a further object of this invention is to provide a motor control circuit that is suitable for the commonly used line transformer winding connections such as wye-delta or delta-wye and is particularly effective for the commonly used wye-delta line transformer configuration having a high leg and a low leg.

Other objects, advantages and capabilities of the present invention will become more apparent as the description proceeds taken in conjunction with the accompanying drawing, in which like parts have similar reference numbers, and in which:

The drawing is a schematic circuit diagram showing a motor protector embodying features of the present invention.

DESCRIPTION OF THE PREFERRED EMBODIMENTS

In the circuit diagram of the drawing, in general there is diagrammatically illustrated a three-phase power supply 5 supplying three-phase electric power over output lines designated L1, L2 and L3 through a magnetic across-the-line starter or motor control circuit 6 to a three-phase electric motor 7. The above elements 5, 6 and 7 are conventional commercially available elements. To the magnetic starter motor control circuit 6 there is connected the motor protector 8 constructed and arranged in accordance with the present invention for protecting against certain line failures described in detail hereinafter. The power supply and motor control circuit will first be described for a fuller understanding of the construction, the association with, and the operation of the motor protector 8.

Power Supply

A three-phase power supply is shown within a dashed block 5 and illustrated as having a high voltage, three-phase power supply 12 which would be high voltage from a plant generator to power lines supplying high-voltage electric power over four lines 13, 14, 15 and 16 through primary fuses 17, 18, 19 and 21, respectively. A line step-down transformer shown comprises three primary windings 22, 23 and 24 connected in a wye configuration having a neutral line 25. Primary windings 22, 23 and 24 are connected to fuses 17, 18 and 20, respectively, with the grounded neutral connected to primary fuse 19. The transformer further has three pairs of secondary windings connected in a delta configuration and specifically there are a pair of secondary windings 27 and 28 in one phase, a pair of secondary windings 31 and 32 forming another phase, and a pair of secondary windings 33 and 34 forming a third phase.

Each pair of the secondary windings is inductively coupled to one of the primary windings. The pairs of secondary windings are connected together in a delta configuration with the common connections between each pair forming the three output terminals to which power output lines designated L1, L2 and L3 are connected.

In the wye-delta transformer connections shown the pair of secondary windings 33 and 34 forms what is commonly referred to as a low leg, the common connection between the two windings being at ground 35. The low leg then is a pair of secondary windings across which there is a connection to ground through one of the secondary windings of that pair.

The other two pairs of secondary windings 27, 28 and 31, 32 are what are commonly referred to as the high legs. These high legs by definition then in the delta configuration comprise a pair of secondary windings in which there is a connection to ground through one secondary winding forming the low leg. This wye-delta configuration is the most frequently used to supply power to a three-phase electric motor.

The alternate power supply that is in common use may be a delta-wye configuration comprising three primary windings connected in a delta configuration and three pairs of secondary windings connected in a delta configuration.

Motor Control Circuit

The magnetic, across-the-line motor control circuit 6 is coupled between the output lines of the power supply 5 and the input terminals of the three-phase electric motor 7 and functions in a conventional manner to selectively connect and remove the electric power in response to the actuation of a start switch 37 that is biased to be normally open and stop switch 38 that is biased to be normally closed. While manually operated start and stop switches are shown for purposes of illustration, automatic start-stop controls may also be used.

In the motor control circuit there is shown line contacts 41, 42 and 43 connected in power lines L1, L2 and L3, respectively. Overload fuses 45, 46 and 47 are shown connected in each of lines L1, L2 and L3, respectively, ahead of an associated line contact. Fused disconnects 51, 52 and 53, each illustrated schematically as an open, on-off electric switch, are connected in lines L1, L2 and L3, respectively, ahead of the fuses and connect directly to the output lines of the power supply 5. Overload protectors 55, 56 and 57 are connected in lines L1, L2 and L3, respectively, below an associated line contactor. Reset buttons 61, 62 and 63 are operatively associated with an associated overload protector 55, 56 and 57, respectively, such that after the line has opened by overcurrent an overload protector is manually reset by manual actuation of an associated reset button.

The line contacts 41, 42 and 43 and an auxiliary maintaining contact 65 are held closed by the energization of a holding coil 66 in a conventional manner. In the usual connections for the motor control circuit as shown (disregarding the connections to the motor protector 8), there is a series circuit across two of the power lines, herein shown as lines L3 and L1, just ahead of the line contacts that regulates the energization and de-energization of the holding coil. This series circuit is shown to include all of the reset buttons 63, 62, 61, holding coil 66, the normally-open start switch 37, and the normally-closed stop switch 38. The maintaining contactor 65 is connected across or in parallel with the start switch 37. In this way, when the start switch 37 is closed the holding coil 66 is energized by the power across lines L3 and L1 and the maintaining contactor closes to bypass the start switch so the start switch 37 may return to an open position and the holding coil is maintained energized through having the stop switch and maintaining contactor closed. Upon actuation or opening of the stop switch 38 the holding coil is de-energized and the line contactors 41, 42 and 43 and maintaining contactor 65 move to an open position.

Motor Protector 8

The motor protector 8 shown comprises a sensing transformer having a primary winding 71, a core 72, and a secondary winding 73. The primary winding 71 is shown connected across power lines L1 and L2 electrically beyond associated line fuses 45 and 46, respectively. The transformer functions to step down the phase voltage for use by a relay. In general, this transformer functions to sense the voltage across one phase of the power supply and specifically windings 32 and 33 of the line step-down transformer, which in the wye-delta configuration is a high leg as above discussed.

An electric relay has a coil 75 connected across the secondary winding 73 through a variable resistor or rheostat 79 and a first set of normally open contacts 76 and a second set of normally open contacts 77. Contacts 76 and 77 close upon the energization of the coil 75 as a result of having normal line voltage across lines L1 and L2.

The protector circuit further includes a sensing transformer having a primary winding 81, core 82 and secondary winding 83. The primary winding 81 is shown connected across power lines L2 and L3 through relay contacts 76 so that, when the voltage across the relay coil 75 reduces a predetermined amount, contacts 76 open and winding 81 is no longer connected across the power lines L1 and L3. This removal of the winding 81 from across the power lines has been found to be of particular importance to a wye-delta transformer configuration because it prevents the high impedance situation and a feedback condition in the phase windings of the line transformer which might otherwise prevent the protector from being effective for some power failure conditions. The sensing transformer also functions to step down the voltage across the lines for use by the relay. The rheostat 79 is connected in a series with secondary winding 73, and coil 75 permits the adjustment of the voltage at which the relay contacts open, affords greater sensitivity to reductions in line voltage by the relay, and allows the protector to be adjusted to operate for currents of a given electric motor installation.

A relay having a coil 85 is connected across the secondary winding through a variable resistor or rheostat 89. In this way, when the voltage across lines L1 and L2 is normal so that the relay coil 71 closes and the sets of contacts 76 close, the primary winding 81 is energized by the voltage across lines L1 and L3. This relay in turn has a set of normally open contacts 86 connected in series with the contacts 77 and in the series circuit of the start and stop switches of the motor control circuit above described so that, when the relay contacts 77 and 86 are closed as is the usual situation when the line power is normal, the motor circuit operates as usual, but when the series circuit containing the holding coil 66 is opened the holding coil is de-energized and the power is removed from the electric motor 7 by the opening of line contactors 41, 42 and 43. Again the rheostat 89 allows the setting of the relay so that the contacts open at a selected voltage, affords greater relay sensitivity to line voltage changes, and facilitates the adjustment of the protector to the current for given motor installation.

Operation

In a full sequence of operation for the above described circuit, when the fused disconnects 51, 52 and 53 are closed, upon the closure of the start siwtch 37 the holding coil becomes energized, closing line contactors 41, 42 and 43 as well as maintaining contactor 65. The closed fused disconnects connect primary winding 71 of the sensing transformer across the high leg or high phase between lines L1 and L2 shown as secondary windings 31 and 32 closing contacts 76 and 77. The primary winding 81 of the other sensing transformer is connected across the low leg or low phase and energized by the power across lines L1 and L3 through contacts 76.

In the event of a failure in the power supply that results in a reduction of voltage between lines L1 and L2 (high leg), contacts 76 and 77 open to de-energize the holding coil and at the same time primary winding 81 is disconnected from being connected across lines L1 and L3 (low leg). In the event of a failure in the power supply which would result in a reduction in the voltage across lines L1 and L3 (low leg), contacts 86 open to de-energize the holding coil and again remove the power from the power supply to the electric motor.

The above-described motor protector is suitable for being field connected for 277–480, 240–480, 120–240 and 120–208 volts in the secondary side of the line transformer. The protector effectively protects three-phase motors against single-phase conditions caused by primary or secondary fuse or line failures in the power supply. This protector will operate on standard transformer voltages on the load side of the fuses in a motor control circuit, operates independently of the motor control circuit, and is only a power supply contol. The protector cannot produce a low voltge condition on the motor control circuit. Blown fuses or extremely low voltages will remove the power from the motor and upon the restoration of power all three phases will automatically restart the motor. When manual start and stop switches are used as distinguished from automatic, the motor is restarted by manually pushing the start switch.

The protector of the present invention can be readily connected to various types of commonly used motor control circuits such as delayed controls, a ground fault protector, load imbalance, overload heat sensing, water control probes and the like. Moreover, this protector can be readily set in the field to compensate for extra in-rush current.

In practice the apparatus of the present invention is contained in a box on the order of 8 × 10 × 4inches and is designed to mount adjacent the controls for the motor in a rain-proof box. In this way it takes up virtually no space in the control panel and the control panel may be repaired without requiring disassembly.

Although the present invention has been described with a certain degree of particularity, it is understood that the present disclosure has been made by way of example and that changes in details of structure may be made without departing from the spirit thereof.

What is claimed is:

1. A motor protector for a three-phase electric motor supplied electric power from a three-phase electric power supply through a motor control circuit, said motor protector comprising:
   a first sensing step-down transformer having a first primary winding energized by the voltage across a first phase of said power supply and having a first secondary winding in which a first secondary voltage is induced from said first primary winding;
   a first relay having a first AC coil in a first series circuit with a first variable resistor and said first secondary winding and having a first set of contacts and a second set of contacts;
   a second sensing step-down transformer having a second primary winding energized by the voltage across a second phase of said power supply through said first set of contacts and having a second secondary winding in which a second secondary voltage is induced from said second primary winding; and
   a second relay having a second AC coil in a second series circuit with a second variable resistor and said second secondary winding electrically independent of said first series circuit and having a third set of contacts, said second and third sets of contacts arranged for controlling the power to said motor control circuit so that when there is a failure in the power supply that reduces the electric voltage across said first phase below a predetermined amount the electric power is disconnected from said second primary winding and removed from said motor and when there is a failure in the power supply that reduces the electric voltage across said second phase below a predetermined amount the electric power is removed from said motor,
   each of said first and second AC coils having a threshold voltage a selected amount of voltage less than the normal sensed voltage in the associated secondary winding above which the power is maintained and below which the electric power is removed from said electric motor,
   each said variable resistor having a maximum relay coil voltage setting, a threshold relay coil voltage setting and a range of intermediate relay coil voltage settings between said threshold and maximum settings, the maximum relay coil voltage setting requiring the greatest amount of sensed phase voltage decrease to actuate the associated relay with less sensed phase voltage decrease necessary as the associated relay coil voltage settings approach the threshold voltage setting so that a lesser reduction in sensed phase voltage is required to actuate the associated relay coil as the settings approach the threshold voltage setting, thereby increasing the sensitivity of the associated relay to decrease in associated phase voltages.

2. A motor protector as set forth in claim 1 wherein said first phase is a high leg of a secondary of a wye-delta connected transformer of said power supply and said second phase is a low leg of a secondary of a wye-delta connected transformer of said power supply.

3. A motor protector as set forth in claim 1 wherein said first phase is a first pair of secondary windings of a wye-delta connected line transformer across which there is no connection to ground and said second phase is a second pair of secondary windings of a wye-delta connected line transformer having a ground connection between said second pair of secondary windings.

4. A motor protector for a three-phase electric motor supplied power from a three-phase power supply through a motor control circuit arranged for selectively connecting electric power to and removing electric power from said motor, said motor control circuit including a normally-open start switch, a normally-closed start switch, and a holding coil for line contactors that couple the power to the motor when energized, and a holding contactor, said holding coil being energized upon actuation of said start switch and held energized through said holding contactor and said stop switch, said motor protector comprising in combination:

a first voltage sensing step-down transformer having a first primary winding connected in parallel with a high leg of said power supply, said first transformer having a first secondary winding in which a first secondary voltage is induced from said first primary winding;

a first relay having a first AC coil connected in a first series circuit with a first variable resistor and said first secondary winding and having a first set of normally open contacts arranged so that when said high leg is energized at a normal line voltage said first set of contacts is closed;

a second voltage sensing step-down transformer having a second primary winding connected across a low leg of said power supply through said first set of contacts for disconnecting said second primary winding from said low leg when there is a failure in said power supply that drops the voltage across said high leg below a predetermined amount, said second transformer having a second secondary winding in which a second secondary voltage is induced from said second primary winding; and a second relay having a second AC coil connected in a second series circuit with a second variable resistor and said second secondary winding electrically independent of said first series circuit with no direct electric connections between said first and second secondary windings, said second relay having a second set of normally-open contacts so that when said low leg is energized at normal line voltage said second set of contacts is closed;

said second set of contacts being connected in said motor control circuit in series with said start switch and holding coil for controlling said motor control circuit so that when there is a failure in the power supply that reduces the electric voltage across said high leg below a predetermined amount the electric power is disconnected from said second primary winding and removed from said motor and when there is a failure in the power supply that reduces the electric voltage across said low leg below a predetermined amount the electric power is removed from said motor.

each of said first and second AC coils having a threshold voltage a selected amount of voltage less than the normal sensed voltage in the associated secondary winding above which the power is maintained and below which the electric power is removed from said electric motor, each said variable resistor having a maximum relay coil voltage setting, a threshold relay coil voltage setting and a range of intermediate relay coil voltage settings between said threshold and maximum settings, the maximum relay coil voltage setting requiring the greatest amount of sensed phase voltage decrease to actuate the associated relay with less sensed phase voltage decrease necessary as the associated relay coil voltage settings approach the threshold voltage setting so that a lesser reduction in sensed phase voltage is required to actuate the associated relay coil as the settings approach the threshold voltage setting, thereby increasing the sensitivity of the associated relay to decreases in associated phase voltages.

5. A motor protector as set forth in claim 4 wherein said motor control circuit includes a fused disconnect and a fuse in each power line from said power supply to the electric motor, said first and second primary windings being connected electrically below an associated fused disconnect and fuse.

6. A motor protector as set forth in claim 4 wherein said first relay has another set of normally-open contacts arranged for controlling said motor control circuit to directly de-energize said holding coil when the voltage across said first phase reduces to below a predetermined amount.

* * * * *